(12) United States Patent
Baines et al.

(10) Patent No.: US 11,416,373 B2
(45) Date of Patent: Aug. 16, 2022

(54) PROVIDING DEBUG INFORMATION ON PRODUCTION CONTAINERS USING DEBUG CONTAINERS

(71) Applicant: International Business Machines Corporation, Armonk, NY (US)

(72) Inventors: Jack S. Baines, Winchester (GB); Kirstine F. L. Clapperton, Southampton (GB); David J. Crighton, Southampton (GB); Rosanna M. Lickorish, London (GB); Martin R. Naish, Berkshire (GB)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 16/507,176

(22) Filed: Jul. 10, 2019

(65) Prior Publication Data
US 2019/0332521 A1    Oct. 31, 2019

Related U.S. Application Data

(63) Continuation of application No. 15/205,143, filed on Jul. 8, 2016, now Pat. No. 10,372,588.

(51) Int. Cl.
  *G06F 11/36* (2006.01)
  *G06F 9/455* (2018.01)

(52) U.S. Cl.
  CPC ........ *G06F 11/3636* (2013.01); *G06F 11/362* (2013.01); *G06F 11/3664* (2013.01); *G06F 11/3696* (2013.01); *G06F 2009/45591* (2013.01)

(58) Field of Classification Search
  CPC ............. G06F 11/3612; G06F 11/3616; G06F 11/362; G06F 11/3664; G06F 11/3668;
  (Continued)

(56) References Cited

U.S. PATENT DOCUMENTS

| 7,992,133 B1 | 8/2011 | Theroux et al. |
| 8,719,804 B2 | 5/2014 | Jain |
| (Continued) | | |

FOREIGN PATENT DOCUMENTS

| CN | 101763307 | 6/2010 |
| CN | 102200944 A | 9/2011 |
| (Continued) | | |

OTHER PUBLICATIONS

Debug.Assert is Causing My Application to Exit by StackOverflow published Apr. 13, 2011 https://stackoverflow.com/questions/5645706/debug-assert-is-causing-my-application-to-exit (Year: 2011).*

(Continued)

*Primary Examiner* — Joseph O Schell
(74) *Attorney, Agent, or Firm* — Schmeiser, Olsen & Watts, LLP; Rakesh Roy

(57) ABSTRACT

A method and system for providing debug information associated with computer software executing in a production container that is replicated as a debug container. The computer software is executed in the production container and corresponding computer software is executed in the debug container. Requests are processed via: a gateway sending each request to the computer software executing in the production container, the gateway replicating each request sent to the computer software executing in the production container, the gateway sending each replicated request to the corresponding computer software executing in the debug container, the computer software executing in the production container executing the requests received from the debug container, the corresponding computer software executing in the debug container executing the replicated requests received from the debug container. The computer software executing in the production container is debugged, using the (Continued)

debug information generated by the computer software executing in the debug container.

17 Claims, 7 Drawing Sheets

(58) Field of Classification Search
CPC .... G06F 11/3672; G06F 11/3696; G06F 9/44; G06F 9/4489; G06F 9/44568; G06F 9/44584; G06F 2009/45591; G06F 11/3636

See application file for complete search history.

(56) References Cited

U.S. PATENT DOCUMENTS

| | | | |
|---|---|---|---|
| 9,117,019 | B2 | 8/2015 | Wintergerst et al. |
| 9,875,173 | B2* | 1/2018 | Marron ................ G06F 11/362 |
| 10,372,588 | B2* | 8/2019 | Baines ................ G06F 11/3636 |
| 10,459,823 | B1* | 10/2019 | Lieberman ............ G06F 11/362 |
| 2005/0044534 | A1 | 2/2005 | Darweesh et al. |
| 2008/0215922 | A1 | 9/2008 | Cheng et al. |
| 2011/0252404 | A1* | 10/2011 | Park ................... G06F 11/3664 717/124 |
| 2012/0051229 | A1* | 3/2012 | Feldmann ............... H04L 43/12 370/242 |
| 2013/0042153 | A1* | 2/2013 | McNeeney ......... G06F 11/1484 714/38.1 |
| 2013/0124705 | A1* | 5/2013 | Smith ................ G06F 11/3684 709/223 |
| 2013/0185770 | A1 | 7/2013 | Patil |
| 2014/0289707 | A1* | 9/2014 | Guan ................. G06F 11/3624 717/124 |
| 2015/0058823 | A1 | 2/2015 | Cai et al. |
| 2015/0193328 | A1 | 7/2015 | Deakin |
| 2015/0229709 | A1 | 8/2015 | Pruss |
| 2016/0019081 | A1* | 1/2016 | Chandrasekaran ......................... G06F 9/45558 718/1 |
| 2016/0342499 | A1* | 11/2016 | Cheng .................. G06F 11/366 |
| 2016/0378528 | A1* | 12/2016 | Zamir .................... G06F 3/065 711/162 |
| 2017/0090996 | A1* | 3/2017 | Birke .................... G06F 9/5011 |
| 2017/0295085 | A1* | 10/2017 | Han ........................ H04L 43/50 |
| 2017/0353496 | A1* | 12/2017 | Pai ..................... H04L 63/1441 |
| 2018/0011775 | A1 | 1/2018 | Baines et al. |

FOREIGN PATENT DOCUMENTS

| | | |
|---|---|---|
| CN | 105224466 | 1/2016 |
| JP | 2014146104 A | 8/2014 |

OTHER PUBLICATIONS

Wikipedia's Solid-state Drive historical version published Jul. 5, 2016 https://en.wikipedia.org/w/index.php?title=Solid-state_drive&oldid=728497339 (Year: 2016).*

Will Adding More RAM Speed Up My Computer by Superuser published Jun. 30, 2013 https://superuser.com/questions/182084/will-adding-more-ram-speed-up-my-computer (Year: 2013).*

Tested: Which PC Upgrades Offer the Biggest Performance Boost for Your Buck? by Marco Chiapetta, Mar. 21, 2014 https://www.pcworld.com/article/444457/tested-which-pc-upgrades-offer-the-biggest-performance-boost-for-your-buck.html (Year: 2014).*

Arora, Nipun et al. , Parikshan: Live Debugging of Production Systems in Isolation, Columbia University Computer Science Technical Reports, Aug. 28, 2015(Aug. 28, 2015) sections 3, 3.2-3.3, 4, 7-8.

ISR/WO—GB160002; International Application No. PCT/IB2017/053319, dated Sep. 21, 2017, 11 pages.

Office Action (dated Feb. 22, 2018) for U.S. Appl. No. 15/205,143, filed Jul. 8, 2016.

Amendment (dated May 21, 2018) for U.S. Appl. No. 15/205,143, filed Jul. 8, 2016.

Final Office Action (dated Jun. 14, 2018) for U.S. Appl. No. 15/205,143, filed Jul. 8, 2016.

Final Amendment (dated Aug. 7, 2018) for U.S. Appl. No. 15/205,143, filed Jul. 8, 2016.

Advisory Action (dated Aug. 30, 2018) for U.S. Appl. No. 15/205,143, filed Jul. 8, 2016.

RCE (Aug. 30, 2018) for U.S. Appl. No. 15/205,143, filed Jul. 8, 2016.

Office Action (dated Sep. 28, 2018) for U.S. Appl. No. 15/205,143, filed Jul. 8, 2016.

Amendment (dated Dec. 27, 2018) for U.S. Appl. No. 15/205,143, filed Jul. 8, 2016.

Notice of Allowance (dated Jan. 24, 2019) for U.S. Appl. No. 15/205,143, filed Jul. 8, 2016.

RCE with IDS (Feb. 26, 2019) for U.S. Appl. No. 15/205,143, filed Jul. 8, 2016.

Notice of Allowance (dated Mar. 21, 2019) for U.S. Appl. No. 15/205,143, filed Jul. 8, 2016.

Daniel Bryant, Debugging Java Applications in Containers, Source: Nov. 3, 2015, Retrieved from Internet: URL:https://www.opencredo.com/2015/11/03/debugging-java-applications-running-in-docker/, 4 pages.

A Method to Support Live Debugging for Node Application in Cloud Environment, IPCOM000239669D Publication Date: Nov. 24, 2014, Retrieved from Internet: URL: https://priorart.ip.com/IPCOM/000239669, 3 pages.

Application No. GB1900612.1; Examination Report; dated Jun. 1, 2021. 4 pages.

Response to examination report; dated Nov. 22, 2021; UK Patent Application No. 1900612.1; 1 page.

Response to examination report/claims; dated Nov. 22, 2021; UK Patent Application No. 1900612.1; 4 pages.

Application No. 201780042143.0, filed Jun. 6, 2017, 10 pages.

Application No. GB1900612.1; Examination Report; dated Oct. 1, 2021. 3 pages.

* cited by examiner

PROVIDING DEBUG INFORMATION ON PRODUCTION CONTAINERS USING DEBUG CONTAINERS

This application is a Continuation application claiming priority to Ser. No. 15/205,143, filed Jul. 8, 2016, now U.S. Pat. No. 10,372,588 issued Aug. 6, 2019.

TECHNICAL FIELD

The present invention relates to providing debug information on production containers, and more specifically to providing debug information associated with computer software executing in a production container using specialized debug containers.

BACKGROUND

Enabling debug traces and debug capabilities in enterprise software often negatively impacts the performance of the enterprise software. For this reason, where problems cannot be recreated in test environments, customers using on-premise solutions are often reluctant to enable debug traces and other debug capabilities. This may make it difficult for customers to collect diagnostic information to solve their own problems. It may also negatively impact support services then asked by a customer to investigate a possible defect in provided software.

SUMMARY

The present invention provides a method, and associated computer system and computer program product, for providing debug information associated with computer software executing in a production container. One or more processors replicate the production container as a debug container. The one or more processors execute the computer software in the production container and the debug container, wherein executing the computer software includes replicating requests sent to the computer software executing in the production container to the computer software executing in the debug container. The one or more processors store requests from the computer software executing in the production container together with any responses to the stored requests. The one or more processors store debug information generated by the computer software executing in the debug container.

BRIEF DESCRIPTION OF THE DRAWINGS

Embodiments of the present invention will now be described in more detail, by way of example only, with reference to the accompanying drawings.

DETAILED DESCRIPTION

Figure 1:
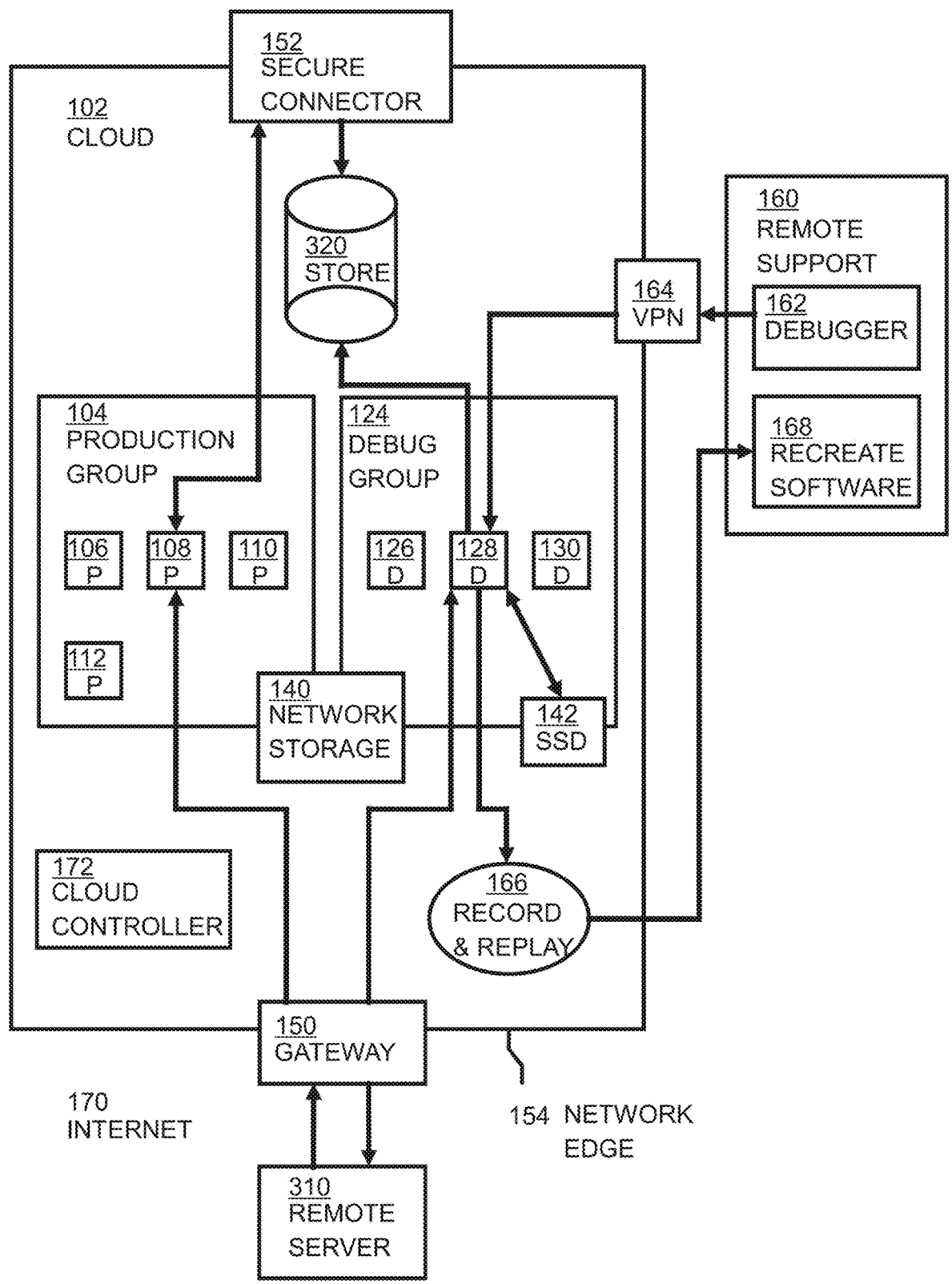
FIG. 1 shows a computer system in which embodiments of the present invention of providing debug information may be implemented.

The present invention improves the functionality of a computer system, and in particular the functionality of a computer system operating in a cloud environment, as will be apparent from the following description of the present invention.

The present invention enables collection of diagnostic information to debug software, using the facilities available in a cloud or Software as a Service (SaaS) to remove risk to production performance and minimize performance impact of debug traces. The present invention also enables reducing cpu-time pricing of debugging operations on a cloud offering.

A hybrid cloud offering typically comprises a group of production containers orchestrated by a cloud controller component. The network edge may be controlled by gateway software or a gateway appliance such as the IBM® Data Power Gateway security and integration platform. In one embodiment, connection can be made via an existing secure connector back to an on-premise environment or private cloud. Containers may self configure from a shared storage network location which contains customer's application definitions.

A container encloses a computer program, or a portion of one, in a layer of software that connects seamlessly to an operating system and other computing resources it depends on to execute. Putting a computer program in a container has a number of benefits. One particular advantage is that the computer program can be moved quickly and easily from one computer to another, for example, from a programmer's laptop to a test system to the cloud.

In embodiments of the present invention, in addition to standard containers, specialized containers are provided that are optimized for debug activities. These containers are specialized in several ways including but not limited to: (i) running debug builds of the computer software may be implemented; (ii) the underlying hardware is specialized to minimize debug costs, for example, the underlying hardware may have Solid state Storage Devices (SSD) mounted so that the Input/Output (I/O) cost of writing trace information is minimized; (iii) auditing capabilities such as a Record and Replay facility may be enabled by default; and (iv) debug ports may be open by default to allow support personnel to debug problems on the debug system in real time.

Embodiments of the present invention provide the capability for any particular customer application to be elastically scaled onto debug containers as well as production containers.

Although prior art specialized debug instances go some way to educing the impact of diagnostic capabilities, there will still be a negative impact on performance. Therefore in order to remove this negative impact, when debug is enabled, in embodiments of the present invention, an existing customer container image is spun up, on demand, onto one of the specialized debug instances of embodiments of the present invention. Network traffic may be automatically duplicated between a debug container and a normal production container by the gateway appliance or by software located on the network edge. Similarly, any outgoing requests made by the production application, either through the gateway appliance on the network edge, or through secure connectors, are stored along with responses to the outgoing requests, so that the same data can be used to simulate the real request happening in the debug container instance.

In the embodiments described above, diagnostic activities may be run on tailored hardware and/or software without any impact to running production workload. Diagnostic information collected in the debug information may be made available to a customer directly through a web management console for the cloud offering. The diagnostic information may also optionally be directly linked into problem ticketing systems used by product support teams for a cloud offering provider. Debug instances may also be available for debug by support personal via direct Virtual Private Network (VPN) access into the debug cloud environment.

FIG. 1 shows a computer system in which embodiments of the present invention of providing debug information may be implemented. A cloud 102 comprises a production group 104 of production containers 106-112. Each production container 106-112 encloses a computer program software), or a portion of one, in a layer of software that connects seamlessly to the operating system (not shown in FIG. 1) and other computing resources (not shown in FIG. 1) the computer program depends upon to run. The software is used in a production environment by a customer in the operation of the customer's business. The cloud 102 further comprises a debug group 124 of debug containers 126-130. Each debug container 126-130 encloses a computer program, or a portion of a computer program, in a layer of software that connects seamlessly to the operating system and other computing resources the computer program depends on to run. The software is not used in a production environment by a customer in the operation of the customer's business, but is used for the purposes of obtaining diagnostic information to assist with the debugging of problems with the computer programs. Each instance of the debug containers 126-130 corresponds to a single instance of the production containers 106-112. There may be any number of production containers 106-112 and any number of debug containers 126-130, but each instance of a debug container 126-130 must correspond to a single instance of a production container 106-112. A production container 106-112 may, or may not, have a corresponding debug container 126-130. A production container 106-112 may have more than one debug container 126-130 associated with the production container for workload sharing or similar purposes.

In one embodiment, only a small number of production containers 106-112 will have a corresponding debug container 126-130.

The production containers 106-112 and the debug containers 126-130 run within the same network environment and share network storage 140 so that a common customer configuration can be loaded by both the debug 126-130 and production 106-112 containers. In one embodiment, debug containers 126-130 execute on specialized hardware. For example, the hardware executing debug containers 126-130 may have SSDs 142 mounted so that the I/O cost of writing trace information is reduced. When a container, either a debug container 126-130 or a production container 106-112, is spun up, configuration data and customer applications are loaded from a location on the shared network storage 140.

The cloud 102 in which the production group 104 and the debug group 124 execute has a gateway 150 for communication external to the customer's premises such as, for example, to a remote server 310. The cloud 102 further has one or more secure connections 152 for connection to another application or similar within the customer premises. Typically, gateway 150 connects to the Internet 170 for communication. Cloud controller 172 orchestrates the other components in FIG. 1 to ensure correct operation of cloud 102.

Debugger 162 executes in a remote support system 160. Remote support system 160 may be at a geographical location remote from that of the production group 104 and the debug group 124, but may also be at the same geographical location as the production 104 and the debug group 124. Remote support system 160 is remote as opposed to local in accordance with well known prior art definitions of remote and local. The functions of remote support system 160 are well known to the person skilled in the art and in the context of embodiments of the present invention, the remote support system 160 includes the recreation and resolution of problems associated with the execution of software within the production group 104. The function of debugger 162 is also well known to the person skilled in the art and in the context of embodiments of the present invention, the debugger 162 includes the analysis of the execution of software within the production group 104, which may be achieved by analysis of the execution of software within the debug group 124 which replicates the production group 104. Virtual Private Network (VPN) 164 provides a secure communication path between the debugger 162 in the remote support 160 and the software executing within the debug group 124. In an embodiment, control information may pass from debugger 162 through VPN 164 to debug container 128 and data may pass either or both ways through VPN 164 between debugger 162 and debug container 128. In other embodiments, connections through the VPN may, optionally, go to debug group 124 or to cloud 102.

Auditing capability may include items such as Record and replay 166 software. Record and replay 166 software ay capture input events received by a piece of computer software, such as the software in debug container 128 executing in debug group 124 and allows that sequence of input events to be later replayed to the piece of software in debug container 128. Record and replay 166 software sends the captured input events to recreation 168 software within the remote support system 160 for storage and later utilization.

Debug containers 126-130 may, in one embodiment, run specialized builds of software.

In an embodiment, a production container 106-112 may run a build of software that executes with assertions disabled in order to achieve maximum performance, while a debug container 126-130 may execute a build of software with assertions enabled to provide fast failure. Assertions comprise an assert statement that checks a Boolean condition and does nothing if true, but immediately terminates a program if false. An assertion may be assumed to be true as expressed in the executable software code. Assert statements may be used to identify, for example, null pointers. The use of assertions allows failures to appear earlier and closer to the locations of the errors, making the errors easier to diagnose and fix.

In an embodiment, a production container 106-112 may run a build of software that does not have debug symbols in order to reduce memory usage, whilst a debug container 126-130 may execute a build of software with debug symbols to increase diagnostic capabilities. Debug symbols comprise information which identifies which portion of the source code of a computer program generated a specific piece of object code in a portion of executable computer software. Debug symbols enable a person debugging a piece of software to gain information about the object code such as the names of variables and routines from the original source code.

In an embodiment, a production container 106-112 may run a build of software that has a maximum number of compiler optimizations enabled for maximum performance of the software, while a debug container 126-130 may run a build of the software that has minimal compiler optimizations so as to increase its debug-ability and to reduce the impact of compiler errors. Compiler optimizations may try to minimize the execution time of a program, to minimize the amount of memory occupied by a program, to minimize the power consumed by a program or to maximize or minimize any other attribute of an executable computer program. Optimizing transformations, particularly those transformations that reorder code, can make it difficult to relate output code to line numbers in an original source code when using a symbolic debugger.

Debug containers 126-130 may, one embodiment, have a specialized configuration.

In an embodiment, a production container 106-112 may execute the software in a configuration in which trace is always turned off for maximum performance, while a debug container 126-130 may execute the software in a configuration in which trace is always turned on full so as to capture as much information as possible about the execution of the software. Trace information is information that is logged concerning a program's execution for, among other purposes, debugging and the identification of problems with the software. Tracing is, in one embodiment, of low level events.

In an embodiment, a production container 106-112 may execute the software in a configuration in which auditing capability is always turned off for maximum performance, while a debug container 126-130 may execute the software in a configuration in which auditing capability is always turned on. Auditing capability may include Record and Replay 166 software. Record and Replay 166 software, in one embodiment, captures input events received by a piece of computer software and allows the sequence of input events to be later replayed to the piece of software.

In an embodiment, a production container 106-112 may execute the software in a configuration in which debug ports are disabled for maximum performance, while a debug container 126-130 may execute the software in a configuration in which debug ports are enabled to allow support personnel to debug the software. A debug port is a port included in software to simplify development and debugging, but which is not necessary for the normal operation of the software. In one embodiment, debug ports are disabled to prevent extra functionality from being used by unauthorized persons.

In one embodiment, debug containers 126-130 may execute on specialized hardware.

In an embodiment, a production container 106-112 may execute the software on hardware which does not have any SSDs 142 mounted, while a debug container 126-130 may execute the software on hardware that has SSDs 142 mounted so as to reduce the I/O costs of storing trace information. SSDs 142 provide much faster storage of information, but the cost of the storage is greater.

In an embodiment, a production container 106-112 may execute the software on hardware which has smaller memory capacity to reduce the total cost of ownership, while a debug container 126-130 may execute the software on hardware that has a larger memory capacity to allow for the memory cost of diagnostics. In one embodiment, a customer may pay a charge for execution of the software on the hardware which is dependent on the amount of memory actually used and so in a production environment, the amount of memory actually used needs to be minimized.

In an embodiment, a production container 106-112 may execute the software on hardware which has smaller CPU capacity to reduce the total cost of ownership, while a debug container 126-130 may execute the software on hardware that has a larger CPU capacity to allow for the cost of debug facilities. A customer may typically pay a charge for execution of the software on the hardware which is dependent on the amount of CPU capacity actually used and so in a production environment, the amount of CPU capacity actually used may beneficially be minimized.

Figure 2:
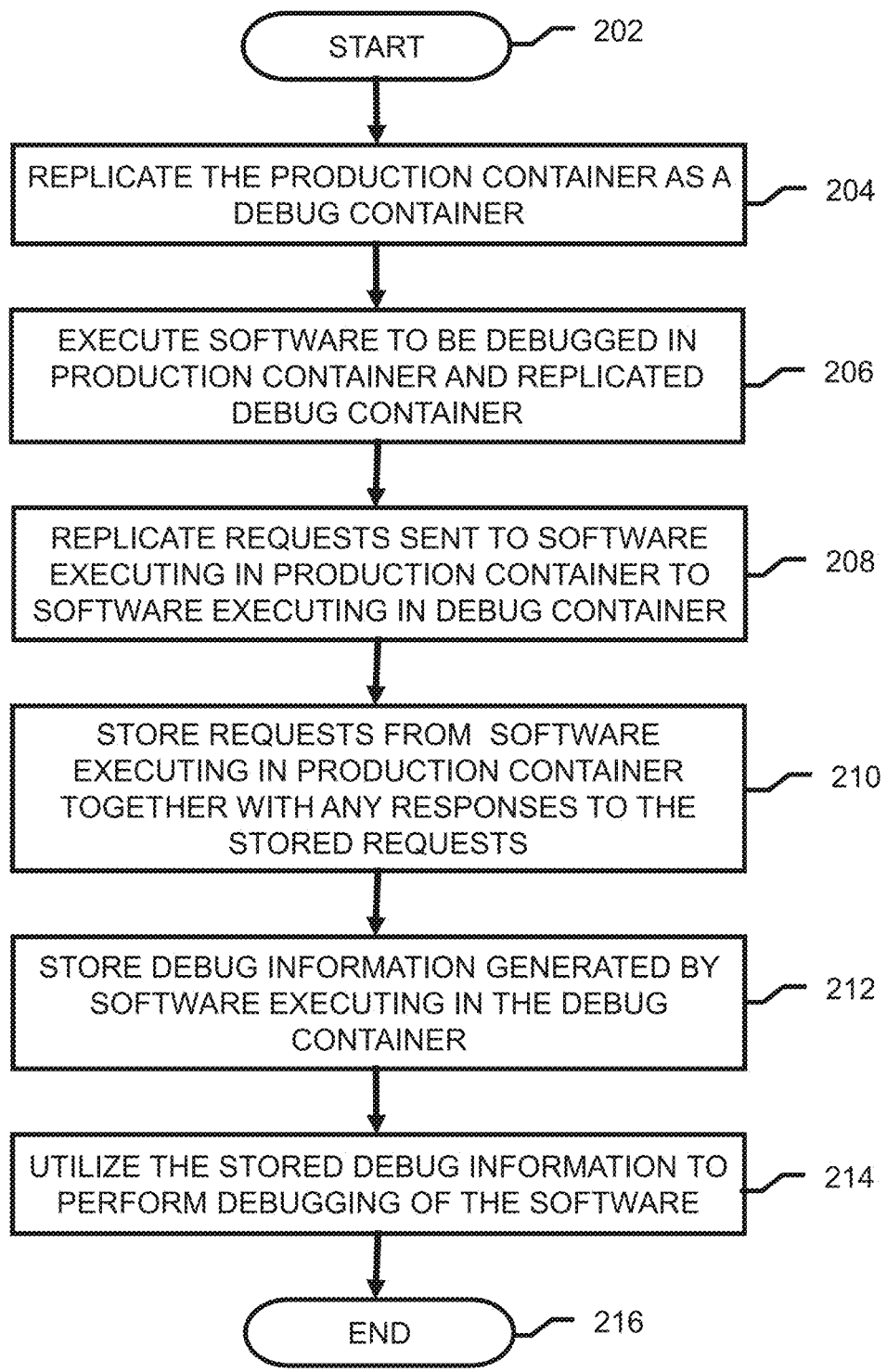
FIG. 2 is a flow chart of an embodiment of a computer-implemented method of providing debug information associated with computer software executing in a production container, in accordance with embodiments of the present invention.

FIG. 2 is a flow chart of an embodiment of a computer-implemented method of providing debug information associated with computer software executing in a production container, in accordance with embodiments of the present invention. The computer-implemented method starts at step 202. At step 204, a production container 106-112 is replicated as a debug container 126-130 in parallel with the production container 106-112. A single production container 106-112 or multiple production containers 106-112 may be replicated as debug containers 126-130. However, each debug container 126-130 typically has a one to one correspondence with a single production container 106-112. An exception to this may be where a production container 106-112 may have more than one debug container 126-130 associated with a production container for workload sharing or similar purposes. In the example of FIG. 1, production container 106 may be associated with debug container 126, production container 108 may be associated with debug container 128 and production container 110 may be associated with debug container 130. Production container 112 is not associated with any debug container and so no debug information is being provided for production container. The number of production containers 106-112 having associated debug containers 126-130 may be any number between zero and the maximum number of production containers 106-112 which may simultaneously execute within a production group 104. The number of debug containers 126-130 may be any number between zero and the number of production containers 106-112 which are actually simultaneously executing within a production group 104. As mentioned above, an exception to this may be where a production container 106-112 may have more than one associated debug container 126-130 for workload sharing or similar purposes.

At step 206, the software to be debugged is executed in both a production container, such as production container 108, and in the replicated debug container, such as debug container 128. In the following description, for the sake of clarity, references in the following description will assume that a single production container 108 has being replicated to a single debug container 128. However, in practice, as described above, any number of production containers 106-112 may have associated replicated debug containers 126-130.

At step 208, gateway 150 located at the network edge 154 replicates requests sent to the computer software executing in the production container 108 to the corresponding copy of the computer software executing in the debug container 128. Each of the computer software executing in the production container 108 and the corresponding copy of the computer software executing in the debug container 128 executes the requests. The difference between the execution in each of the containers is that the computer software executing in the production container 108 does so on a production version of the software, in a production configuration and on production hardware, while the computer software executing in the debug container 108 does so on a debug version of the software, in a debug configuration and on debug hardware. All of these differences aid the collection of debug information associated with the execution of the computer software. In embodiments, the difference may be any one or more of a debug version of the software, in a debug configuration and on debug hardware.

At step 210, a copy of any outbound request from the computer software executing in the production container 108 is stored together with any associated inbound responses to the stored request. These requests may either be through secure connector 152 to a local server or through gateway 150 to a remote server 310.

By storing the request and any associated responses, the stored associated responses can be presented to the computer software executing in the debug container 128 as if the responses had resulted from a real request from the computer software executing in the debug container 128. It is undesirable for the computer software executing in the debug container 128 to actually be able to make a real request because there may be side effects to the making of the requests due to the computer software executing in the debug container 128 and therefore possibly on a debug version of the software, in a debug configuration and on debug hardware. By presenting a copy of the associated response to the computer software executing in the debug container 128, the same stimulus is presented to the debug container 128 ensuring that any problems in the production environment 104 are recreated in the debug environment 124, thus enabling accurate collection of diagnostic and debug information to be collected to aid problem solution determination, which is all achieved with no, or minimal impact on the operation of the production environment 104.

After step 210, various embodiments of the invention are possible. In the embodiment depicted in FIG. 2, steps 212 and 214 are carried out after step 210. In another embodiment, only step 212 is carried out and the debug information is stored for later analysis. In a further embodiment, the debug information is transiently stored so that live interactive debug may be performed such that the requests and the debug information are interactively sent to the debugger 162.

At step 212, debug information generated by the computer software executing in the debug container 128 is stored. In an embodiment, the debug information may be stored to network storage 140 shared with the computer software executing in the production container 108. In another embodiment, the debug information may be stored to an SSD 142 so that the I/O costs of writing the additional debug information is minimized.

At step 214, the stored debug information to debug the computer software executing in the production container 108 is utilized. Although the stored debug information was obtained from the computer software executing in the debug container 128, the stored debug information can be used to debug the computer software executing in the production container 108 because the debug container 128 was replicated from the production container 108. The step of using the stored debug information is carried out in the same way as is done for conventionally stored debug information. However, embodiments of the present invention have the advantage that the production container 108 continues to operate normally without changes being made to the software, configuration or hardware so as to allow the debug information to be collected or so as to allow re efficient collection of the debug information. The computer-implemented method ends at step 216.

Figure 3:
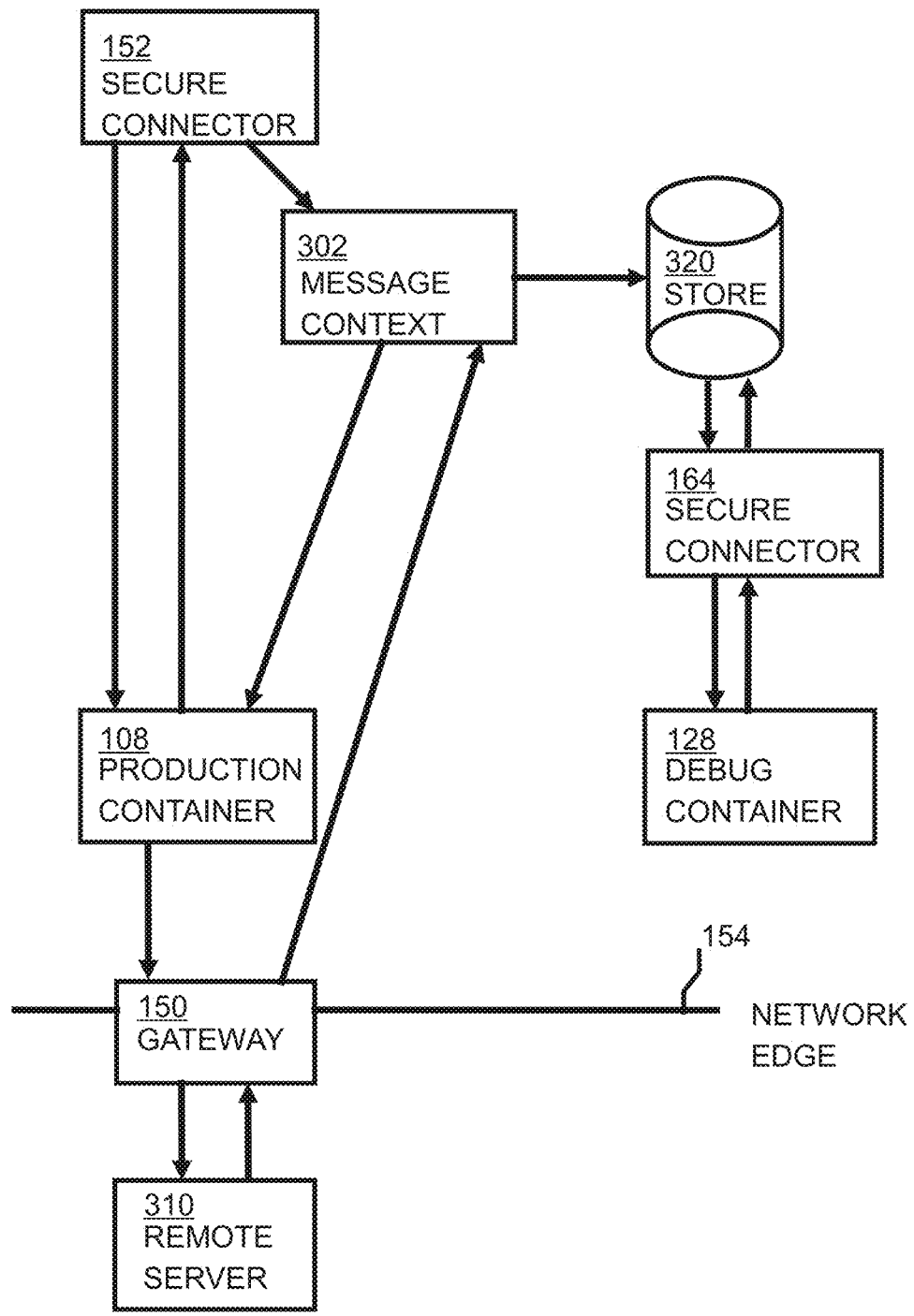
FIG. 3 is a block diagram of an embodiment of an implementation of the replication of a requests and responses step of FIG. 2, in accordance with embodiments of the present invention.

FIG. 3 is a block diagram of an embodiment of an implementation of the replication of a requests and responses step in 208 of FIG. 2, in accordance with embodiments of the present invention. At step 208, all traffic to the production container 108 is duplicated by a gateway 150 appliance on the network edge 154 and the duplicated copy of the request is sent to the specialized debug container 128. Similarly, if requests are made out of the production container 108, either via the gateway 150 or via a secure connector 152 to an on premise or private cloud environment, then a copy of the outgoing request and an associated response to the outgoing request is stored. Thus, the saved response can be presented to a debug application transparently without the production container making a real request to the outside world, so as to prevent side effects from running the debug containers 126-130.

Production container 108 may make a request out of the cloud environment to remote server 310 through gateway 150 located at the network edge 154. Production container 108 may also make a request through secure connector 152 to a local server. In either case the gateway 150 or the secure connector 152 associates the message context 302 of the request with the reply that is received from the remote server 310 and stores the received reply in store 320. Store 320 associated with the debug container 128 is then accessed by the debug container 128 instance through secure connector 152.

The message context 302 data stored is transport dependent but needs to be able to uniquely identify a request being made. In an embodiment, this enablement may be some combination of end point address and headers, possibly including a transaction ID.

The computer software executing in the debug container 128 may have the software's outgoing request routed to the story 320 rather than the real gateway 150 at the network edge 154 or the secure connector 152 end point. The message context 302 is used to look up the stored reply which is then presented to the computer software executing in the debug container 128 as if the reply had come from the remote 310, but without actually calling the real remote endpoints, which may have desired side effects.

Diagnostic data including debug information may be made available via a web portal and may further be made available to support staff via direct integration with a preexisting problem ticketing system.

Embodiments of the specialized debug containers 126-130 of the present invention may be initiated in several ways. Although four ways are described below in FIGS. 4-7, embodiments of the invention are not limited to these four ways. The actual replication of debug containers 126-130 may be controlled by a cloud controller 172 or an orchestration component or similar. The integration of embodiments of the invention, which provide a specialized debug capability into a cloud offering to provide a full range of debug options, will now be described.

Figure 4:
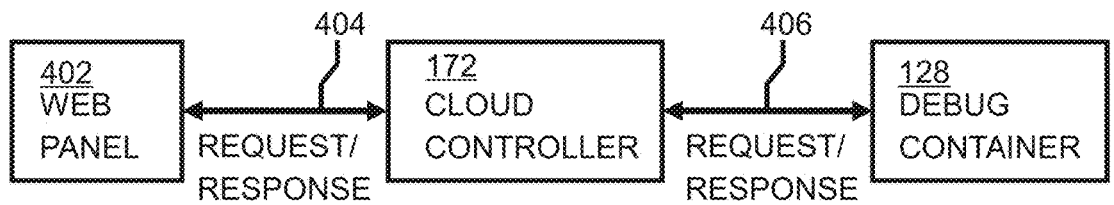
FIG. 4 is a block diagram of a first, user initiated, computer-implemented method of invoking the computer-implemented method of FIG. 2, in accordance with embodiments of the present invention.

FIG. 4 shows is a block diagram of a first, user initiated, computer-implemented method of invoking the computer-implemented method of FIG. 2, in accordance with embodiments of the present invention. In a first embodiment, a user may, through the use of a web control panel 402, specifically ask for a particular application to be run in debug mode. In a second embodiment, a user may choose some percentage of production containers 106-112 to run in debug mode. In a third embodiment, a user may ask for all requests to be run in debug mode. In any of these embodiments, when the user initiates the computer-implemented method of FIG. 2 by making a request 404, cloud controller 172 through request 406 initializes the appropriate number of debug containers 126-130 and reconfigures the gateway 150 at the network edge 154 and the secure connector 152 so that requests are routed correctly to the production 106-112 and the debug containers 126-130 (e.g., debug container 128). Responses 406, 404 may be returned to the web panel 402 through the cloud controller 172 to confirm the correct routing of the requests.

Figure 5:
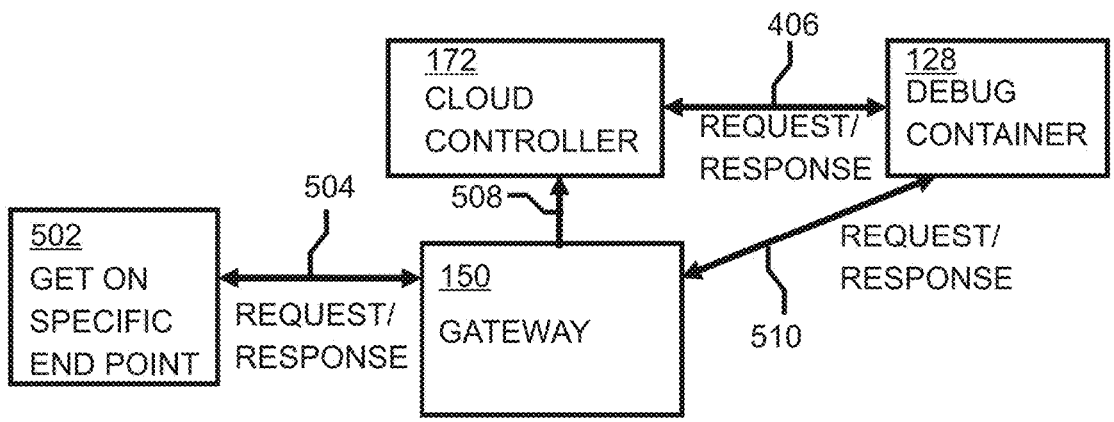
FIG. 5 is a block diagram of a second, user initiated per request, computer-implemented method of invoking the computer-implemented method of FIG. 2, in accordance with embodiments of the present invention.

FIG. 5 is a block diagram of a second, user initiated per request, computer-implemented method of invoking the computer-implemented method of FIG. 2, in accordance with embodiments of the present invention. In an embodiment, a user may submit a specific request which should be run in debug mode, which may be useful, for example, when message data is suspected to be the trigger for the problem under investigation. In this embodiment, the request may have a special HTTP header or URI parameter that indicates that debug should be turned on. In FIG. 5, the specific request 504 made by the user is shown as "Get on specific end point" 502, which may, for example, be a request such as "GET/msgflow?debug=true". The "debug=true" portion is a specific parameter that indicates that debug should be turned on. In this embodiment, when the user submits the specific request with a debug flag enabled to gateway 150, the user submits a request 508 to the cloud controller 172. Cloud controller 172, through request 406, initializes the appropriate number of debug containers 126-130 (e.g., debug container 128) and reconfigures the gateway 150 at the network edge 154 and the secure connection 152 so that the request is routed correctly to the production 106-112 and the debug 126-130 containers. Response 406 and request 508 to cloud controller 172 and gateway 150 are returned to the user through request 504 to indicate whether or not the debug container 128 has been set up. Once the debug container 128 has been set up, the debug container 128 receives 510 requests and sends 510 responses through gateway 150. Once the request has been fully processed, the debug container is automatically terminated, the debug information having been saved to the network storage 140 or to the SSD 142.

Figure 6:
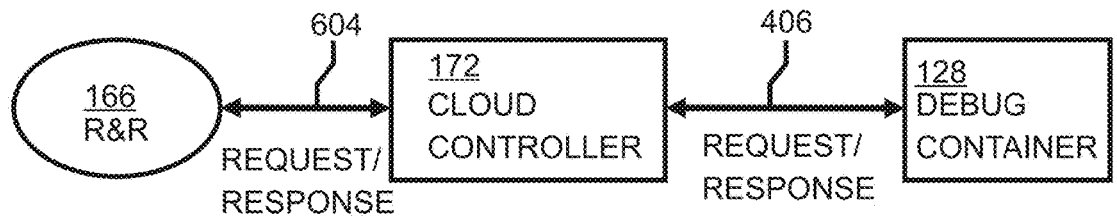
FIG. 6 is a block diagram of a third computer-implemented method of invoking the computer-implemented method of FIG. 2 using a replay of messages recorded earlier, in accordance with embodiments of the present invention

FIG. 6 is a block diagram of a third computer-implemented method of invoking the computer-implemented method of FIG. 2 using a replay of messages recorded earlier, in accordance with embodiments of the present invention. If an auditing capability Record and Replay 166 is available, then it is possible to automatically schedule replay of messages which were not processed successfully on computer software executing in a debug container 126-130. In this embodiment, the debug container 126-130 executes independently of the production container 106-112 and messages to the debug container 126-130 are submitted as a batch process. Record & Replay (R&R) 166 submits 604 a request to cloud controller 172, which, via request 406 initializes the appropriate number of debug containers 126-130 and reconfigures the gateway 150 at the network edge 154 and the secure connection 152 so that requests are routed correctly to the production container 106-112 and the debug containers 126-130. Responses 406, 604 are used to indicate whether the debug container 128 has been successfully set up.

Figure 7:
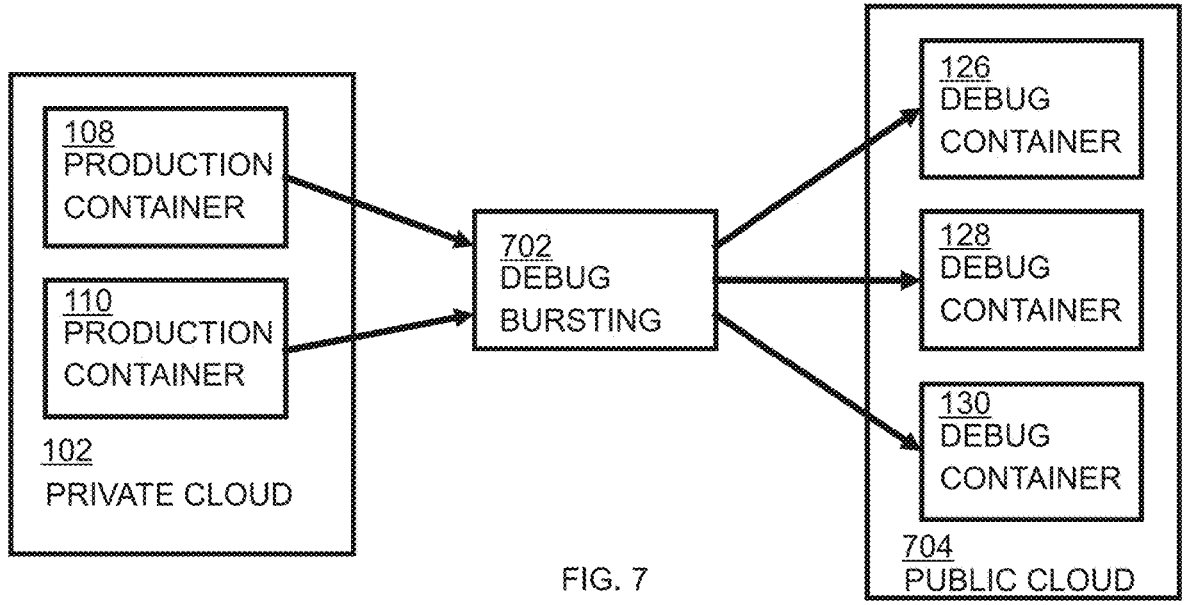
FIG. 7 is a block diagram of a fourth computer-implemented method of invoking the computer-implemented method of FIG. 2, in accordance with embodiments of the present invention.

FIG. 7 is a block diagram of a fourth computer-implemented method of invoking the computer-implemented method of FIG. 2, referred to as debug bursting 702, in accordance with embodiments of the present invention. If a user encounters an error in a private cloud environment or an on-premise environment, the private cloud environment or the on-premise environment may not have the capacity to run diagnostic tools without impacting the production workload of the private cloud environment or the on-premise environment. Similarly the user may not have access to some of the specializations that are available in a hosted cloud offering such as, for example, access to internal debug builds. In this embodiment, debug containers 126, 128, 130 are initialized in the cloud offering on demand based on a configuration provided by the user from the user's on premise or private cloud environment. Production containers 108, 110 in the private cloud 102 environment use debug bursting to send information to debug containers 126-130 in a public cloud 704. In this embodiment, the debug container 126-130 is in a different cloud (public cloud 704) than the private cloud 102 that the production container 108, 110 is in.

Figure 8:
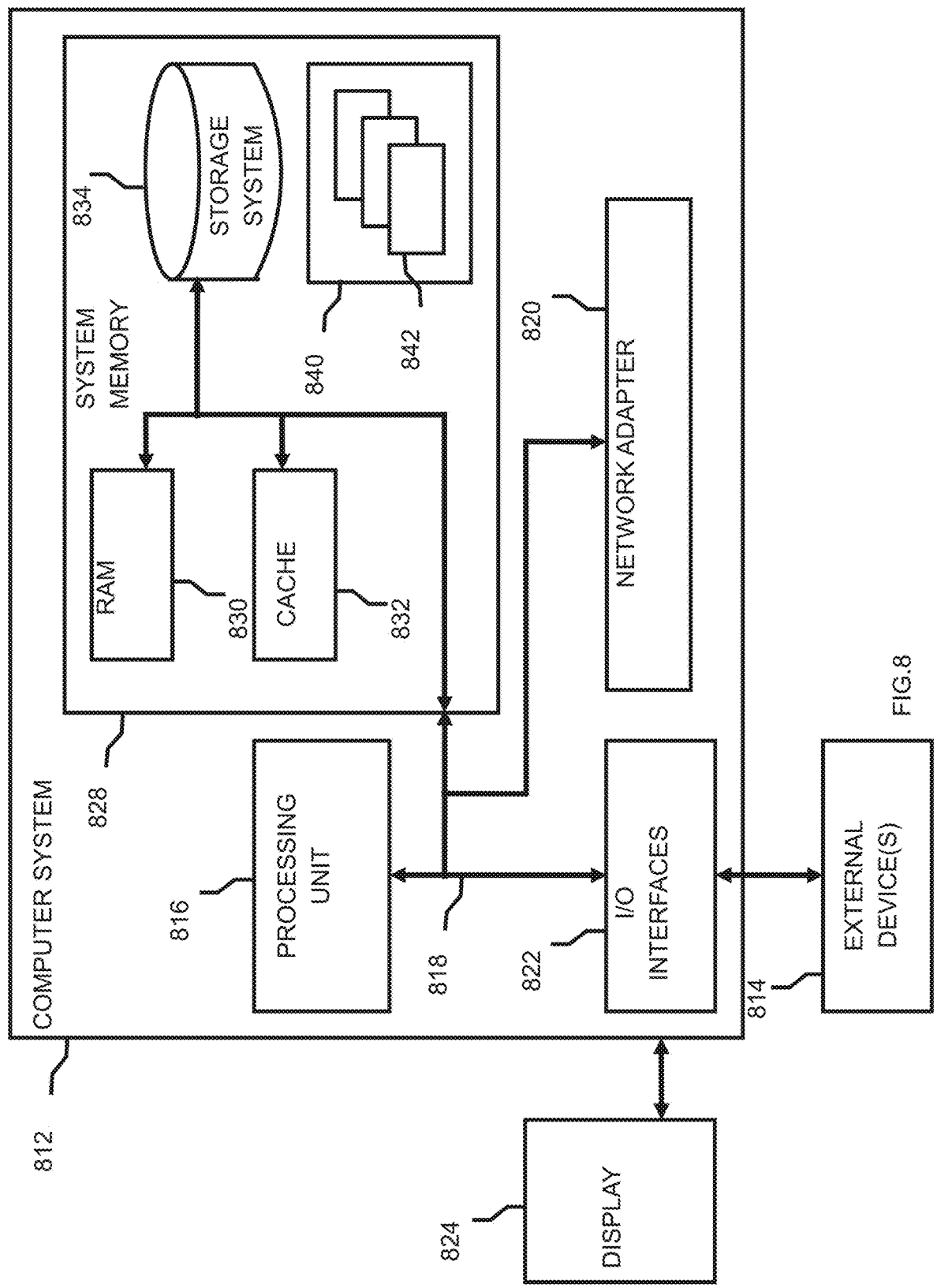
FIG. 8 is a schematic diagram of an exemplary computer system which may be used in implementing embodiments of the present invention.

FIG. 8 is a schematic of an exemplary computer system 812 which may be used in implementing embodiments of the present invention. Computer system 812 is only one example of a suitable computer system and is not intended to suggest any limitation as to the scope of use or functionality of embodiments of the invention described herein. Regardless, computer system 812 is capable of being implemented and/or performing any of the functionality set forth hereinabove.

Computer system/server 812 is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 is shown in the form of a general-purpose computing device. The components of computer system/server 812 may include, but are not limited to, one or more processors or processing units 816, a system memory 828 denoting one or more memories, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, one or more hardware storage devices including, inter alia, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g. mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g. storage, processing, bandwidth and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g. web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g. host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g. mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g. cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
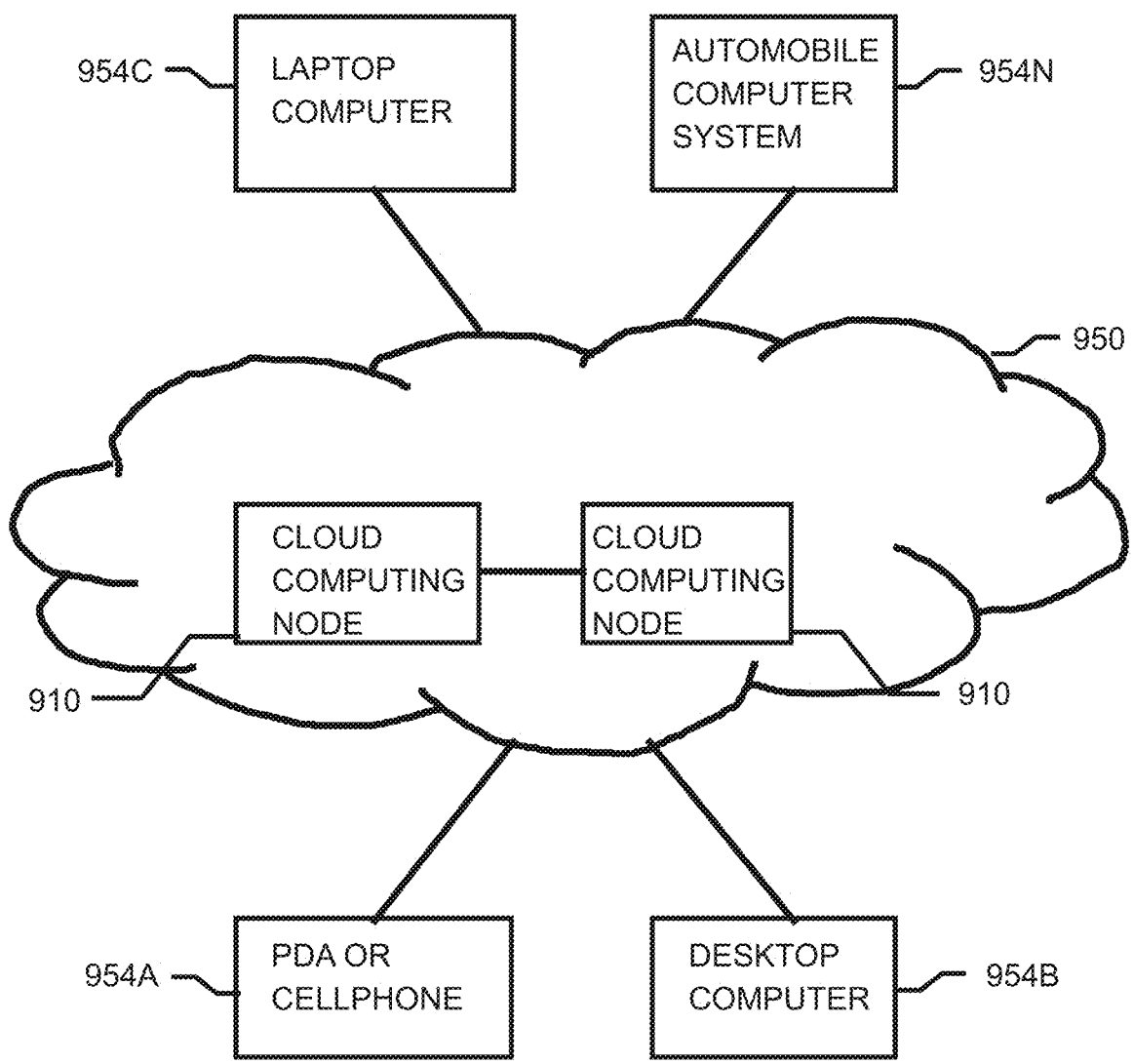
FIG. 9 depicts an illustrative cloud computing environment, in accordance with embodiments of the present invention.

Referring now to FIG. 9, illustrative cloud computing environment 950 is depicted, in accordance with embodiments of the present invention. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms, and/or software as services for which a cloud consumer does not need to maintain resources on a local computing device. It is understood that the types of computing devices 954A-954N shown in FIG. 9 are intended to be illustrative only and that computing nodes 910 and cloud computing environment 950 can communicate with any type of computerized device over any type of network and/or network addressable connection (e.g. using a web browser).

Figure 10:
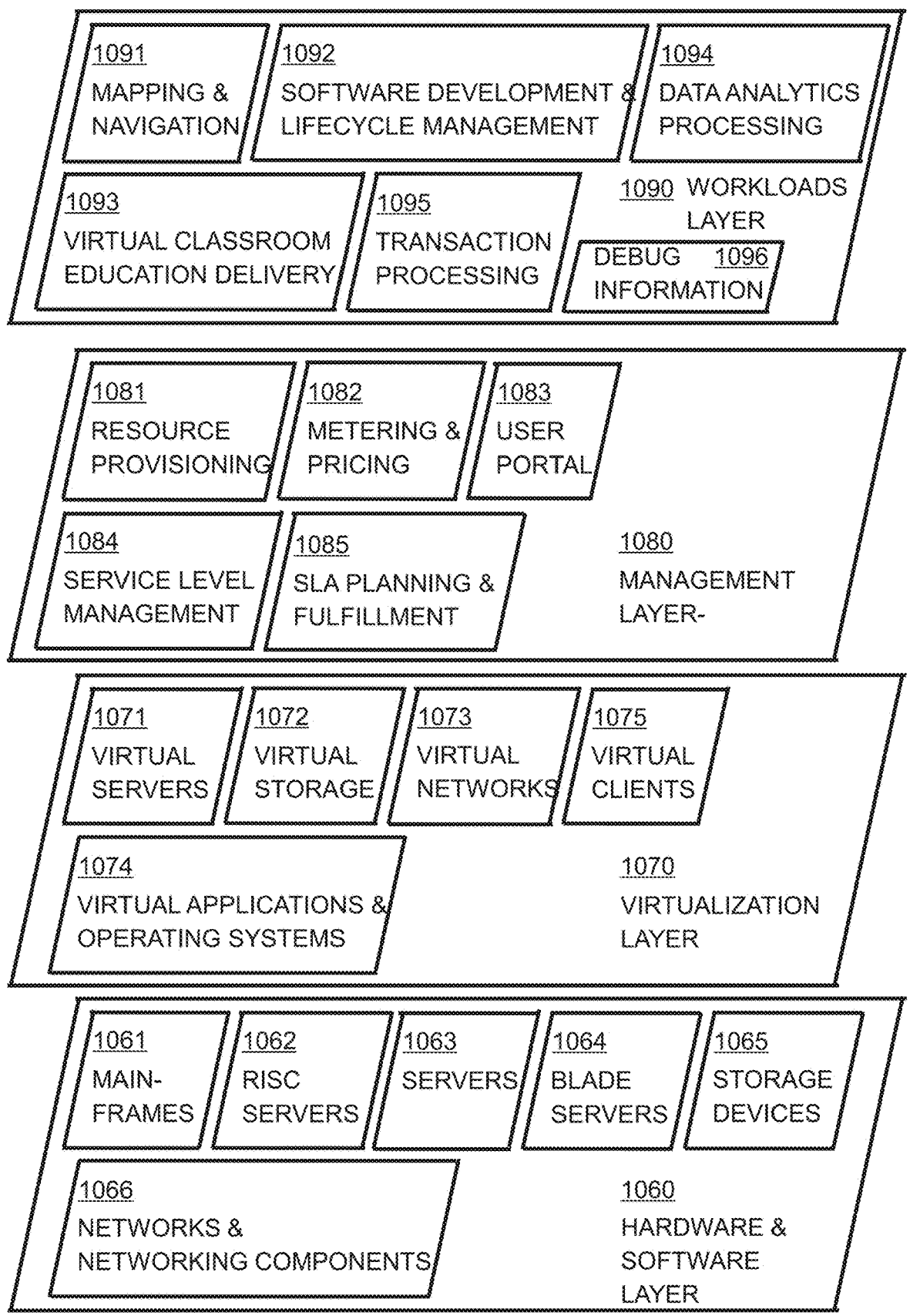
FIG. 10 depicts a set of functional abstraction layers provided by the cloud computing environment of FIG. 9, in accordance with embodiments of the present invention.

Referring now to FIG. 10, a set of functional abstraction layers provided by cloud computing environment (950 in FIG. 9) is shown, in accordance with embodiments of the present invention. It should be understood that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. Examples of software components include network application server software. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provides pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and debug information 1096. As mentioned above, all of the foregoing examples described with respect to FIG. 10 are illustrative only, and the invention is not limited to these examples.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other pro ram able data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program instructions stored therein, said program instructions executable by one or more processors to implement the methods of the present invention.

A computer system of the present invention comprises one or more processors, one or more memories, and one or more computer readable hardware storage devices, said one or more hardware storage device containing program instructions executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing debug information associated with computer software executing in a production container, said method comprising:
   replicating, by one or more processors, the production container as a debug container;
   executing, by the one or more processors, the computer software in the production container and corresponding computer software in the debug container;
   sending, by the one or more processors to remote server via a gateway, an outbound request from the computer software executing in the production container;
   receiving, by the one or more processors from the remote server via the gateway, inbound responses to the outbound request;
   sending, by the one or more processors to a data store for storage in the data store, the outbound request together with the inbound responses via an indirect path from the gateway to the data store, said indirect path being routed through at least one intervening connection between the gateway and the data store;
   presenting, by the one or more processors, the stored inbound responses to the computer software executing in the debug container; and
   debugging, by the debug container via the one or more processors using the inbound responses presented to the computer software executing in the debug container, the computer software executing in the production container.

2. The method of claim 1, said method further comprising:
   storing, by the one or more processors, debug information generated by the corresponding computer software executing in the debug container; and
   utilizing, by the one or more processors, the stored debug information through a web interface.

3. The method of claim 1, said method further comprising:
   said production container running a first build of software that has a maximum number of compiler optimizations enabled for maximum performance of the computer software; and
   said debug container running a second build of the computer software that has a minimal number of compiler optimizations so as to increase a debug ability of the debug container and to reduce an impact of compiler errors.

4. The method of claim 1, wherein the computer software in the debug container is executed on hardware that is optimized for generating debug information by using solid state storage devices, a larger memory capacity than the production container's memory capacity, and a larger CPU capacity than the production container's CPU capacity.

5. The method of claim 1, wherein the method further comprises:
   said one or more processors recording, and subsequently replaying to the computer software executing in the debug container, the user requests and responses of execution of the computer software in the production container.

6. The method of claim 1, wherein the production container is in a private cloud and the debug container is in a public cloud.

7. The method of claim 1, said executing the computer software in the production container and corresponding computer software in the debug container comprising:
   executing, on production hardware in the production containers, a production version of software code; and
   executing, on debug hardware in the debug container, a debug version of the software code.

8. The method of claim 1, said method further comprising:
   in response to completion of said debugging, terminating the debug container.

9. A computer system, comprising one or more processors, one or more memories, and one or more computer readable hardware storage devices, said one or more hardware storage device containing program instructions executable by the one or more processors via the one or more memories to implement a method for providing debug information associated with computer software executing in a production container, said method comprising:
   replicating, by the one or more processors, the production container as a debug container;
   executing, by the one or more processors, the computer software in the production container and corresponding computer software in the debug container;
   sending, by the one or more processors to a remote server via a gateway, an outbound request from the computer software executing in the production container;
   receiving, by the one or more processors from the remote server via the gateway, inbound responses to the outbound request;
   sending, by the one or more processors to a data store for storage in the data store, the outbound request together with the inbound responses via an indirect path from the gateway to the data store, said indirect path being routed through at least one intervening connection between the gateway and the data store;
   presenting, by the one or more processors, the stored inbound responses to the computer software executing in the debug container; and
   debugging, by the debug container via the one or more processors using the inbound responses presented to the computer software executing in the debug container, the computer software executing in the production container.

10. The computer system of claim 9, said method further comprising:
    storing, by the one or more processors, debug information generated by the corresponding computer software executing in the debug container; and
    utilizing, by the one or more processors, the stored debug information through a web interface.

11. The computer system of claim 9, said method further comprising:
    said production container running a first build of software that has a maximum number of compiler optimizations enabled for maximum performance of the computer software; and
    said debug container running a second build of the computer software that has a minimal number of compiler optimizations so as to increase a debug ability of the debug container and to reduce an impact of compiler errors.

12. The computer system of claim 9, wherein the computer software in the debug container is executed on hardware that is optimized for generating debug information by using solid state storage devices, a larger memory capacity than the production container's memory capacity, and a larger CPU capacity than the production container's CPU capacity.

13. The computer system of claim 9, wherein the method further comprises:
said one or more processors recording, and subsequently replaying to the computer software executing in the debug container, the user requests and responses of execution of the computer software in the production container.

14. A computer program product, comprising one or more computer readable hardware storage devices having computer readable program instructions stored therein, said program instructions executable by one or more processors of a computer system to implement a method for providing debug information associated with computer software executing in a production container, said method comprising:
replicating, by the one or more processors, the production container as a debug container;
executing, by the one or more processors, the computer software in the production container and corresponding computer software in the debug container;
sending, by the one or more processors to remote server via a gateway, an outbound request from the computer software executing in the production container;
receiving, by the one or more processors from the remote server via the gateway, inbound responses to the outbound request;
sending, by the one or more processors to a data store for storage in the data store, the outbound request together with the inbound responses via an indirect path from the gateway to the data store, said indirect path being routed through at least one intervening connection between the gateway and the data store;
presenting, by the one or more processors, the stored inbound responses to the computer software executing in the debug container; and
debugging, by the debug container via the one or more processors using the inbound responses presented to the computer software executing in the debug container, the computer software executing in the production container.

15. The computer program product of claim 14, said method further comprising:
said production container running a first build of software that has a maximum number of compiler optimizations enabled for maximum performance of the computer software; and
said debug container running a second build of the computer software that has a minimal number of compiler optimizations so as to increase a debug ability of the debug container and to reduce an impact of compiler errors.

16. The computer program product of claim 14, wherein the computer software in the debug container is executed on hardware that is optimized for generating debug information by using solid state storage devices, a larger memory capacity than the production container's memory capacity, and a larger CPU capacity than the production container's CPU capacity.

17. The computer program product of claim 14, wherein the method further comprises:
said one or more processors recording, and subsequently replaying to the computer software executing in the debug container, the user requests and responses of execution of the computer software in the production container.

* * * * *